Figure 4:
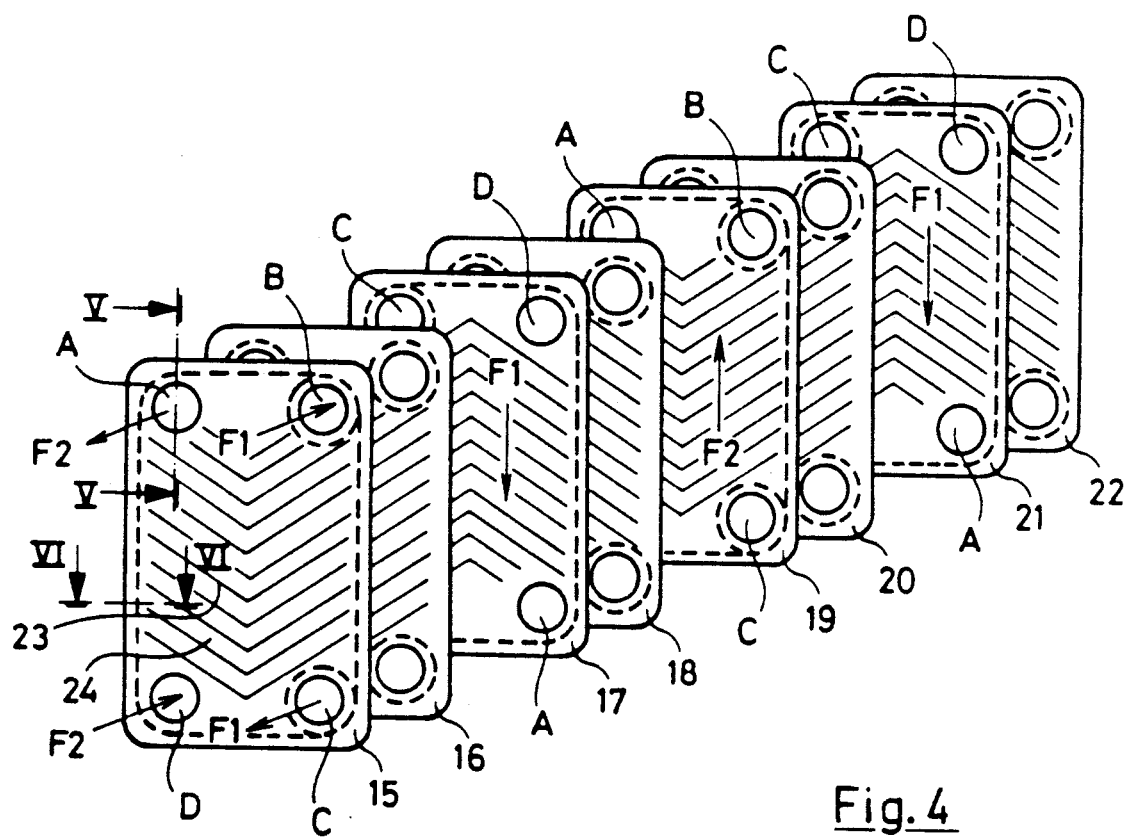

United States Patent [19]

Blomgren et al.

[11] Patent Number: 5,291,945

[45] Date of Patent: Mar. 8, 1994

[54] BRAZED PLATE HEAT EXCHANGER

[75] Inventors: Ralf Blomgren, Skanör; Anders Engström, Johannishus, both of Sweden

[73] Assignee: Alfa-Laval Thermal AB, Lund, Sweden

[21] Appl. No.: 934,493

[22] PCT Filed: Mar. 21, 1991

[86] PCT No.: PCT/SE91/00220

§ 371 Date: Oct. 21, 1992

§ 102(e) Date: Oct. 21, 1992

[87] PCT Pub. No.: WO91/17404

PCT Pub. Date: Nov. 14, 1991

[30] Foreign Application Priority Data

May 2, 1990 [SE] Sweden .................. 9001568-6

[51] Int. Cl.$^5$ ............................................ F28F 3/08
[52] U.S. Cl. ............................. 165/167; 165/166
[58] Field of Search ............... 165/70, 166, 167

[56] References Cited

U.S. PATENT DOCUMENTS

| | | | |
|---|---|---|---|
| 3,360,038 | 12/1967 | Stampes | 165/166 |
| 3,438,435 | 4/1969 | Wennerberg | 165/167 |
| 4,249,597 | 2/1981 | Carey | 165/166 |
| 4,708,199 | 11/1987 | Yogo et al. | 165/167 |
| 4,987,955 | 1/1991 | Bergqvist et al. | 165/167 |
| 5,069,276 | 12/1991 | Seidel | 165/166 |

FOREIGN PATENT DOCUMENTS

| | | | |
|---|---|---|---|
| 57996 | 9/1940 | Fed. Rep. of Germany | 165/166 |
| 835006 | 3/1952 | Fed. Rep. of Germany | 165/166 |
| 86590 | 5/1986 | Japan | 165/166 |
| 122493 | 6/1986 | Japan | 165/166 |
| 528089 | 10/1940 | United Kingdom | 165/166 |
| 668905 | 3/1952 | United Kingdom | 165/166 |
| 867869 | 5/1961 | United Kingdom | 165/166 |
| 5866 | 10/1986 | World Int. Prop. O. | 165/166 |
| 6463 | 11/1986 | World Int. Prop. O. | 165/70 |

Primary Examiner—John Rivell
Assistant Examiner—L. R. Leo
Attorney, Agent, or Firm—Davis Hoxie Faithfull & Hapgood

[57] ABSTRACT

A plate heat exchanger is composed of a number of plate elements each of which comprises two thin nested plates, the elements defining flow spaces between them, adjacent elements being joined around their periphery by brazing bent edge portions, there being brims extending from the edge portions of each plate element, each brim being spaced from the brims of adjacent plate elements.

3 Claims, 3 Drawing Sheets

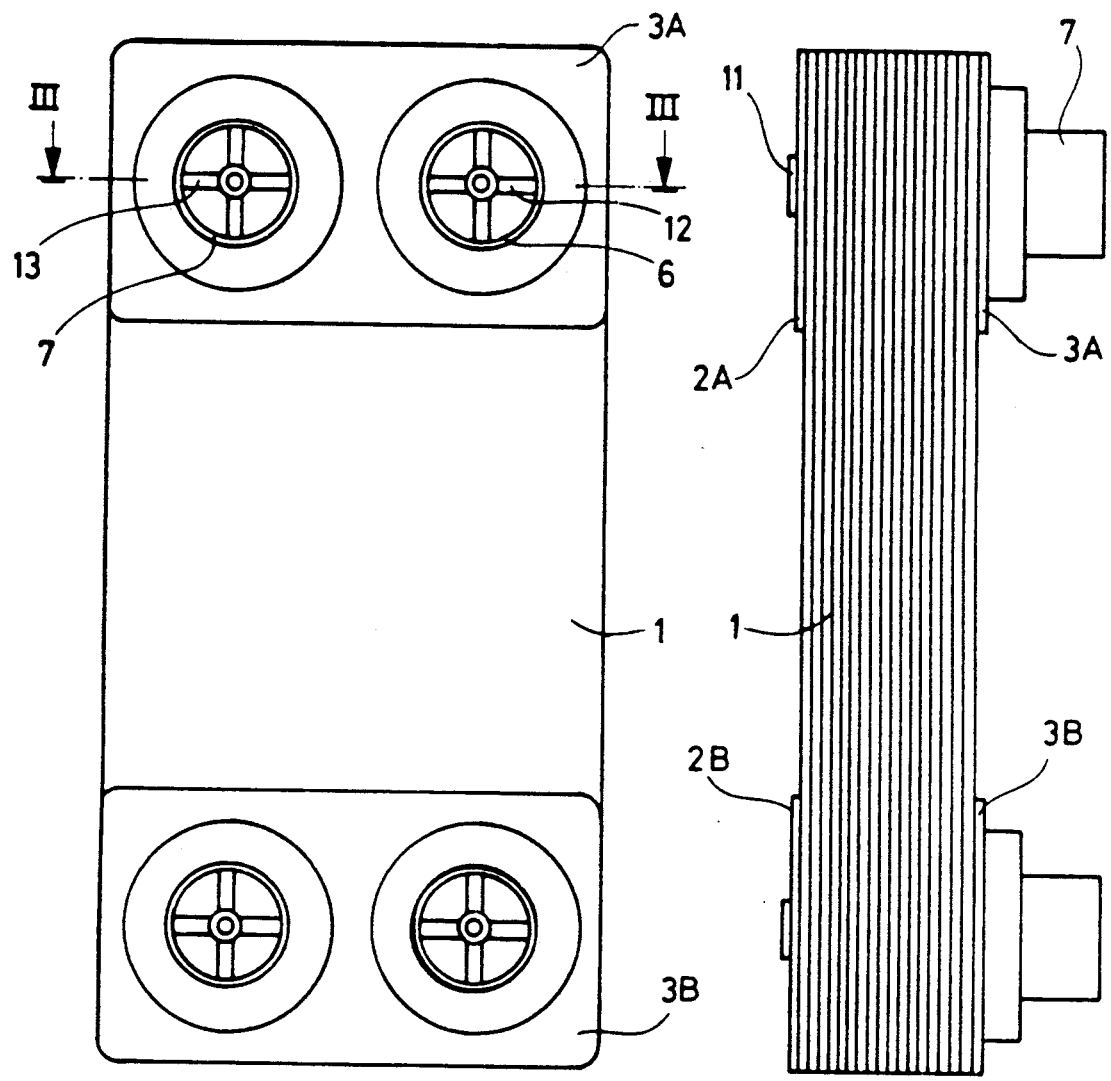
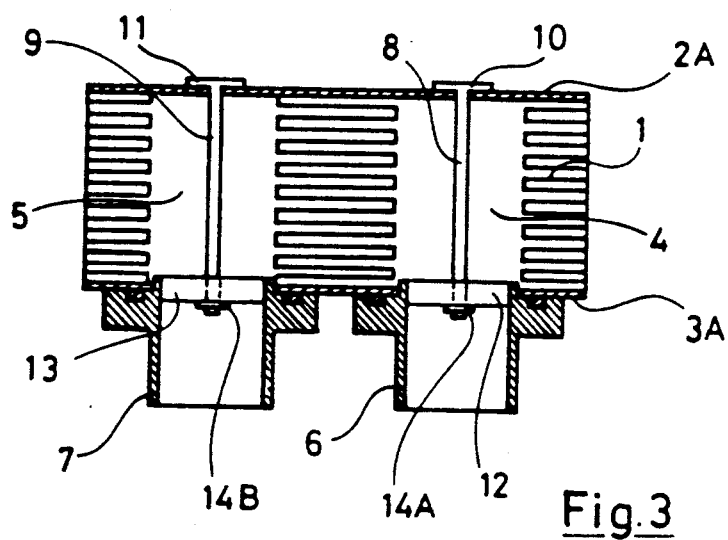
Fig.1  Fig.2
Fig.3

BRAZED PLATE HEAT EXCHANGER

The present invention concerns a plate heat exchanger comprising a stack of plate elements, each of which has a central heat transferring portion and a surrounding edge portion, the heat transferring portions of the plate elements being permanently joined together at several spaced places and confining between themselves flow spaces for two heat exchange fluids, and the edge portions of the plate elements having parts extending around the plate elements, which parts are bent in the same direction in said stack and are permanently joined together by a connecting material, e.g. a brazing material, which at one time has been liquid.

A plate heat exchanger of this kind, shown for instance in GB-A 2 005 398, is produced in a way such that a large number of plate elements are stacked together with thin foils of some suitable brazing material in the plate interspaces, whereafter the finished stack is pressed together and put into a furnace. In the furnace the brazing material melts to liquid and the plate elements are brazed together. In the heat transferring portions the plate elements are brazed together at a lot of spaced points, where crossing corrugation ridges of adjacent plate elements abut against each other, and along the edge portions the plate elements are brazed together around the whole of their peripheries, so that the flow spaces between the plate elements are closed from connection with the surrounding atmosphere.

Brazed heat exchangers of the kind here described are very cheap to manufacture. Firstly, all the plate elements may be shaped alike, every second one being rotated 180° in its own plane relative to the others.

Secondly, the plate elements may be easily stacked upon each other, since the edge portions bent in the same direction function as guiding means between adjacent plate elements. Even the stacking operation itself is facilitated because the plate elements after having been produced can be maintained with their edge portions oriented in the same direction.

It has long been desired that the so called double-wall technique should be used also in connection with brazed plate heat exchangers of the kind just described as in connection with other types of plate heat exchangers. The double-wall technique means that each plate element comprises two separate heat transferring plates which abut closely against each other but, in spite of this, admit a heat exchange fluid leaking out through a hole in one of the heat transferring plates to be conducted between the heat transferring plates to the edge portion of the plate element, where the leakage may be observed.

Plate heat exchangers using the double-wall technique are needed in connection with the transfer of heat from one fluid to another, when the fluids are of a kind requiring an extra security to be created for preventing one fluid from leaking into the flow ways of the other. The alternative to the double-wall technique in such cases is the use of two separate conventional plate heat exchangers, a third fluid of some suitable kind being used to receive heat in the one plate heat exchanger from said one fluid and to transmit the heat to said other fluid in the other plate heat exchanger. Plate heat exchanger systems of this kind comprising brazed plate heat exchangers are used for instance in connection with heating of tap water in houses by means of hot water from a remote heating plant.

In attempts to use the double-wall technique in connection with brazed heat exchangers of the initially described kind difficulties have arisen in connection with the brazing operation, however, since brazing material has found its way in between and, uncontrollably, brazed together the heat transferring plates in each separate plate element. Thereby, the possibility of observing leakage of a heat exchange fluid through one of the heat transferring plates in a plate element could not always be guaranteed.

The double-wall technique has, indeed, been used previously in connection with brazed plate heat exchangers of a different kind, which can be seen for instance from US-A 4 249 597. However, a brazed heat exchanger of this kind lacks the advantages from the production point of view, which have initially been described in connection with plate elements stackable with their bent end portions turned in the same direction in the stack.

The object of the present invention is, therefore, to provide a brazed plate heat exchanger which can be produced as cheaply as possible and in which the so called double-wall technique may be used.

This object is obtainable according to the invention by modification of a plate heat exchanger of the initially defined kind in a way such that each plate element is of a double-wall construction and comprises two thin heat transferring plates of the same size, which are pressed substantially to the same shape and which closely abut against each other but still admit a heat exchange fluid leaking out through a hole in one of the heat transferring plates to be conducted between the plates to the edge portion of the plate element, and that the heat transferring plates of each plate element have brims situated outside the part of the plate element edge portion, which is connected with a corresponding part of an adjacent plate element edge portion by means of said connecting material, said brims being bent so that two adjacent brims of two adjacent plate elements are spaced from each other.

By such a construction of the plate elements it has proved possible in connection with the brazing operation to avoid undesired introduction of brazing material between the heat transferring plates closely abutting against each other in the respective plate elements. Liquid brazing material that is normally present to a certain excess between the plate elements now can collect and be maintained by surface tension forces in the spaces between said brims of the plate elements at a substantial distance from their outermost edges. Thus, there will be no possibility for the brazing material to be sucked in between the heat transferring plates of each plate element by capillary forces.

For avoiding costly auxiliary working and treatment of certain heat transferring plates the said brims preferably are shaped such that the brims of two heat transferring plates of the same plate element abut closely against each other in the same manner as the other portions of the heat transferring plates. However, if an increased security would be desired against introduction of connecting material between the heat transferring plates of each plate element, the brims of the heat transferring plates, within the scope of the invention, may be formed such that they do not at all abut against each other, or abut against each other only in areas spaced from each other along the edge of the plate element.

Thanks to the brims the heat transferring plates will be provided with edge portions having a shape that substantially facilitates production of and dealing with the plates by means of machinery equipment. This contributes to making the plate heat exchanger inexpensive to manufacture.

Figure 5:
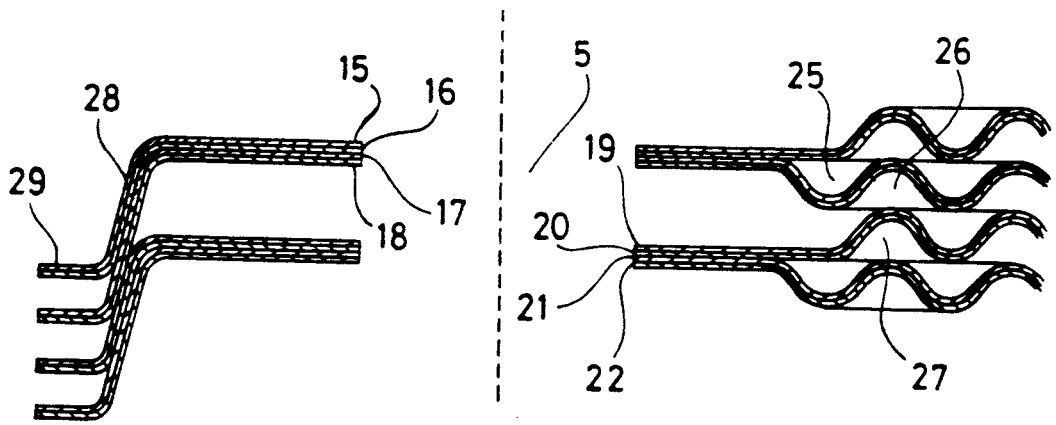
Figure 6:
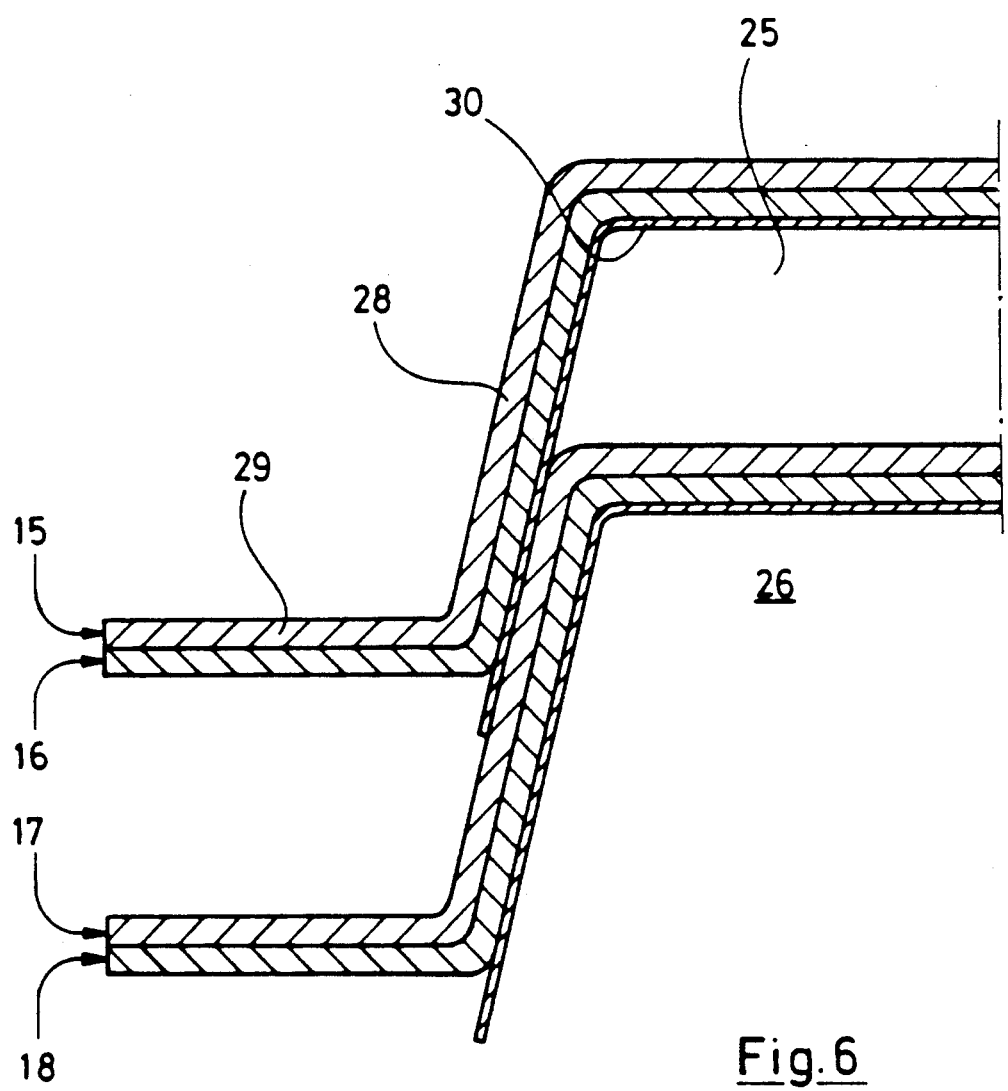

The invention is described in the following with reference to the accompanying drawing in which FIG. 1-3 schematically show a plate heat exchanger of the kind concerned by the invention, seen from the front (FIG. 1), from the side (FIG. 2) and in section (FIG. 3) along a line III—III in FIG. 1, respectively, FIG. 4 schematically shows some of the heat transferring plates in the plate heat exchanger according to FIG. 1-3, separated from each other, FIG. 5 shows a section through some of the heat transferring plates in a plate heat exchanger according to the invention, taken along a line V—V in FIG. 4, and FIG. 6 shows a section through some of the heat transferring plates according to the invention, taken along a line VI—VI in FIG. 4.

The plate heat exchanger in FIG. 1-3 comprises a package 1 of double heat transferring plates and four end plates 2a, 2b and 3a, 3b. All of the plates are permanently joined together by brazing. The heat transferring plates in their upper parts have aligned through flow openings which form passages 4, 5 through the plate package (FIG. 3). The passage 4 communicates with certain interspaces between the heat transferring plates, whereas the passage 5 communicates with other plate interspaces, as schematically shown in FIG. 3. Two tubular connecting members 6 and 7 are arranged opposite to the passages 4 and 5, respectively, and seal against the outside of the end plate 3a. The connecting members are releasably kept pressed against the end plate 3a by means of rods 8 and 9, respectively, which are firmly connected with washers 10 and 11 located outside the end plate 2a. The rods 8 and 9 extend through central holes in cross formed oaks 12 and 13, which are firmly connected with the connecting members 6 and 7, respectively. Nuts 14a and 14b are threaded onto the end portions of the rods 8, 9 outside the oaks 12 and 13, respectively.

Corresponding passages, connecting members, rods, oaks, etc. are present in the lower part of the plate package, as shown in FIG. 1 and 2.

FIG. 4 shows schematically eight alike heat transferring plates intended to be included in a plate heat exchanger according to FIG. 1-3. Of the plates which are numbered 15-22, the plates 17, 18 and 21, 22 are turned 180° in their respective planes relative to the plates 15, 16 and 19, 20.

The plates 15-22 are produced from thin sheet metal which by pressing has been provided with corrugations in the form of ridges 23 and valleys 24. These ridges and valleys form a herring bone pattern on both sides of the so called heat transferring portion of each plate.

Each plate is rectangular and has in each of its corner portions, named port portions in the following, a through flow opening. Thus, the plates 15, 16, 19 and 20, which are all oriented in the same manner, has aligned through flow openings A, B, C and D, respectively, and each of the plates 17, 18, 21 and 22 has corresponding through flow openings A-D, which are located differently however as a consequence of the rotation of these plates 180° relative to the other plates.

By dotted lines it has been illustrated in FIG. 4 how the different heat transferring plates are intended to seal against each other when they are permanently joined together in a plate package. Thus, it can be seen that the plates 15 and 16 should be joined and seal against each other only around the through flow openings A-D. Since the plates 15 and 16 are oriented in the same manner in the plate package, the ridges 23 of the plate 16 will be located in the valleys on the backside of the plate 15, forming the ridges 23 on the front side of the plate 15. Between the plates 15 and 16 there is thus formed no real interspace but the plates contact each other substantially over their whole surfaces. No heat exchange fluid should normally flow between the plates 15 and 16.

In the same manner the plates 17 and 18, 19 and 20, and 21 and 22, respectively, should contact each other and be sealingly joined together only around each one of the through flow openings A-D.

The plates 16 and 17 which are orientated in different manners should together define a plate interspace through which a heat exchange fluid is to flow. For this purpose these plates should be fluid tightly joined together both along their edge portions and around two of the through flow openings of each plate, as can be seen from FIG. 4. Thus, FIG. 4 shows a dotted line along the edge portion of the plate 17 around both the heat transferring portion and all of the four port portions of the plate 17. Apart from that, a dotted line is shown around the through flow opening C of the plate 17. A corresponding dotted line should have been shown around the through flow opening B of the plate, but this through flow opening is hidden behind the plate 16. As can been seen, there is no dotted lines surrounding each of the openings A and D of the plate 17.

In the interspace between the plates 16 and 17 the ridges 23 of the plate 17 will cross and abut against the ridges of the backside of the plate 16, which are formed by the valleys 24 on the front side of this plate.

The plates 16 and 17 should be permanently joined in all of the contact places coming up between abutting ridges, but between these contact points there is formed a flow space between the plates. This flow space communicates with the openings A and D to the right in the plate 17 (with reference to FIG. 4) and with the opposite openings B and C in the plate 16, but the flow space does not communicate with the other openings in these two plates.

Also the plates 20 and 21 cooperate in the same manner as the plates 16 and 17. The plates 18 and 19 cooperate in a similar manner, but in this case the flow space between the plates communicates with the openings A and D to the left in the plate 19 (with reference to FIG. 4) and with the opposite openings B and C in the plate 18.

The through flow openings A-D of the heat transferring plates form passages through the plate package for two heat exchange fluids. By means of arrows in FIG. 4 it is illustrated how a first fluid F1 is conducted into the plate package through the opening B of the plate 15 and returns through the opening C of the same plate, and how a second fluid F2 is conducted into the package through the opening D of the plate 15 and returns through the opening A of the same plate. During operation of the plate heat exchanger the fluid F1, as is shown, will flow through the spaces between the plates 16 and 17 and between the plates 20 and 21, which are connected in parallel, whereas the fluid F2 will flow through the space between the plates 18 and 19.

For obtainment of abutment between two port portions of one heat transferring plate, e.g. the plate 18, and two port portions of an adjacent plate, e.g. the plate 19, that is turned 180° in its own plane relative to the first said plate, two diagonally placed portions of each plate are situated in different planes. Thus, the port portions around the openings B and C on the shown side of each plate are situated in the same plane as the crests of the ridges 23, whereas the port portions around the openings A and D on the other side of the plate are situated in the same plane as the crests of those ridges which are formed on this other side of the plate by the valleys 24.

For obtainment of abutment between the edge portions of adjacent plates, one of which is turned 180° in its own plane relative to the other, the edge portions of all of the plates are bent in the same direction so that they will partly overlap each other. This can be seen in FIG. 5 showing a section through some cooperating plates in a plate heat exchanger according to the invention.

FIG. 5, that can be regarded as a section along the line V—V in FIG. 4 through the plates shown therein when they are joined together in a plate package, shows that the plates abut against each other in pairs, surface against surface, without forming any flow space, and that adjacent such pairs of plates form between themselves flow spaces 25, 26 and 27 for two heat exchange fluids. The flow spaces 25 and 27 are intended for one heat exchange fluid and the flow space 26 is intended for the other heat exchange fluid. Only the last mentioned flow space 26 communicates with the shown passage 5 through the plate packages (see FIG. 3).

The plates 15-18 as well as the plates 19-22 are fluid tightly joined together around the passage 5. At the edge portions of the plates only the plates 16 and 17, 18 and 19, and 20 and 21, respectively, are fluid tightly joined, whereas the plates 15 and 16, 17 and 18, 19 and 20, and 21 and 22, respectively, only abut against each other.

It has been described above in connection with the plate arrangement in FIG. 4 how two heat exchange fluids are intended to flow in a plate heat exchanger according to the invention. If one of these fluids, e.g. the fluid F1, is strongly corrosive, and, therefore, after some time of operation of the heat exchanger would cause a hole to come up in one heat transferring plate, e.g. the plate 17, part of the fluid F1 would leak out between the plates 17 and 18. These plates abut closely against each other but owing to the pressure prevailing in the flow space between the plates 16 and 17 the fluid will be pressed out between the plates 17 and 18 and flow further in some direction towards and past the edges of these plates. The leakage, thereby, can be observed, so that measures can be taken, before the fluid F1 has caused a hole also in the plate 18 which would result in mixing of the fluids F1 and F2.

In FIG. 5 those parts of the plate edge portions, which by being bent partly overlap each other, are designated 28. Outside these parts 28 the plates are formed with brims 29. Each such brim extends in a plane parallel with the plane in which the main part of the plate extends.

Like the plates in general the brims 29 abut in pairs against each other. Thus, without being connected with each other the brims 29 of the plates 15 and 16, 17 and 18, 19 and 20, and 21 and 22, respectively, abut closely against each other, whereas substantial spaces are present between the brims 29 of the plates 16 and 17, 18 and 19, and 20 and 21, respectively.

FIG. 6 shows the edge portions of the plates 15 to 18 in a sectional view taken along the line VI—VI in FIG. 4 immediately before the plates have been brazed together. A thin foil 30 of some brazing material has been placed between the plates 16 and 17.

In the manner illustrated in FIG. 6 first a number of plates are stacked, a thin foil 30 of a brazing material having substantially the same size as a plate being placed in every second plate interspace, i.e. in each of the interspaces between the plates 16 and 17, between the plates 18 and 19 and between the plates 20 and 21. In the rest of the plate interspaces, i.e. in each of the interspaces between the plates 15 and 16, between the plates 17 and 18, between the plates 19 and 20 and between the plates 21 and 22, brazing material is arranged only in the areas of the port portions of the plates. After that the end plates 2a, 2b and 3a, 3b are arranged together with brazing material between these plates and the package of heat transferring plates. The whole plate package is compressed such that a good contact is obtained between the plates, after which the plate package in a furnace is subjected to heat so that the plates are brazed together.

Thanks to the brims 29 a certain limited amount of excess liquid brazing material present between the brims of the plates 16 and 17—close to the bent and overlapping parts 28 of these plates—cannot enter between the plates 15 and 16 and between the plates 17 and 18.

When the plate package has been removed from the furnace, the rods 8, 9 with their washers 10, 11 may be mounted at any suitable time, and the connecting members 6, 7 with their oaks 12, 13 may be threaded on by means of the nuts 14a, 14b.

We claim:

1. Plate heat exchanger comprising a stack of plate elements, each of which has a central heat transferring portion and a surrounding edge portion, the heat transferring portions of the plate elements being permanently joined together at several spaced places and defining between themselves flow spaces for two heat exchange fluids, the edge portions of the plate elements having parts extending around the plate elements, which parts are bent in a like direction in said stack and are permanently joined by means of a connecting material which at one time was liquid, wherein:

each plate element is of a double-wall construction and comprises two nested thin heat transferring plates of the same size, which are pressed substantially to the same shape and which closely abut against each other but are arranged to admit a heat exchange fluid leaking out through a hole in one heat transferring plate to be conducted between the plates to the edge portion of the plate element, and the heat transferring plates of each plate element have brims situated outside the part of the plate element edge portion which is connected with a corresponding part of an adjacent plate element edge portion by means of said connecting material, said brims being bent so that two adjacent brims of two adjacent plate elements are spaced from each other.

2. Plate heat exchanger according to claim 1, wherein the brims of the two heat transferring plates in each plate element abut closely against each other.

3. Plate heat exchanger according to claim 1 wherein the brims (29) extend in planes parallel to the heat transferring portions of the plates.

* * * * *